United States Patent [19]

Thurston

[11] Patent Number: 4,769,539

[45] Date of Patent: Sep. 6, 1988

[54] ELECTRO-OPTICAL ROLL ANGLE DETECTOR

[76] Inventor: William H. Thurston, 513 Soledad Mountain Rd., La Jolla, Calif. 92037

[21] Appl. No.: 847,918

[22] Filed: Apr. 3, 1986

[51] Int. Cl.⁴ .............................................. G01D 5/34
[52] U.S. Cl. ................................ 250/231 R; 356/152
[58] Field of Search ................. 33/366, 341; 256/150, 256/138, 152; 250/231 R

[56] References Cited

U.S. PATENT DOCUMENTS 3,207,904 9/1965 Heinz ................................... 356/150
3,637,312 1/1972 Cantor et al. ........................ 356/152

*Primary Examiner*—David C. Nelms
*Assistant Examiner*—Chung Seo
*Attorney, Agent, or Firm*—Lawrence Fleming

[57] ABSTRACT

An electro-optical instrument means for measuring the relative angle of roll about an optical axis extending between a sending unit and a receiving unit. The measurement is independent of relative displacements in pitch and yaw within the dimensional limits of the apparatus. The sending unit comprises a pair of light sources behind respective apertures in a mask and differently modulated. The apertures are imaged onto a divided photodetector on the receiving unit. Each half of the detector receives modulated light from both sources. The differently-modulated photocurrents are separated electrically, and the roll angle computed from the ratios of the separated components. These ratios are unaffected by relative displacements of the two units in pitch and yaw.

6 Claims, 2 Drawing Sheets

ELECTRO-OPTICAL ROLL ANGLE DETECTOR

BACKGROUND

Needs exist for the sensitive measurement of small angles of roll between separated objects, i.e., of relative rotation about an axis in space connecting the two objects. An electro-optical roll angle detector filling such needs lends itself to combinations that involve known autocollimator principles, but afford simultaneous measurement of relative angles of roll, pitch, and yaw between separated objects or bodies. Such combinations are useful, e.g., in measuring the alignment of bored holes; the roll detector is useful as a pickoff for the stable platform in guidance and navigation systems.

BRIEF SUMMARY

A sending unit comprises a pair of distinctively-modulated light sources, a mask having an aperture for each, and a projection lens. A separate receiving unit comprises a dual photodetector or "bi-cell", and is normally positioned on the optical axis of the projection lens. The apertures in the mask are imaged on the bi-cell.

When the receiving unit is displaced angularly in roll about the optical axis, the photocurrents in the two halves of the bi-cell change, because the illuminated areas have changed. Circuitry is provided to process these changed signal currents into an electrical output signal proportional to the roll angle. Within the limits of the boundaries of the bi-cell and the images, this output signal does not vary with linear displacements of the receiving unit in a plane perpendicular to the optical axis, i.e., it is independent of pitch and yaw. This works as follows:

The photocurrents each contain two separable modulated signal components, as of different frequencies or time codes. Each half of the bi-cell feeds a pair of filters or decoders which perform the separation. Each of the separated components measures the area of one of the image portions on its photosensitive surface, independently of the other image.

A ratio-computing circuit then takes the ratio of the separated signals. These separation and ratio-computing elements are provided in duplicate, one for each half of the bi-cell. The difference between the outputs of the two ratio computers is the measure of the roll angle. The relations of roll angle to signal ratio may be linearized by known electronic means, such as digitizers and microprocessors.

When the images are displaced linearly on the photosensitive surfaces, as in pitch or yaw, rather than angularly as in roll, the absolute magnitudes of the illuminated areas vary, but the above ratios do not. Hence, the output signal that measures roll angle is not affected by pitch or yaw.

This roll detector is useful as a pickoff for the stable platform in guidance and navigation and in apparatus for precisely measuring the alignment of bored holes, and in other applications requiring precise measurement of small angles in a plane normal to the line of sight.

IN THE DRAWING

DETAILED DESCRIPTION

Figure 1:
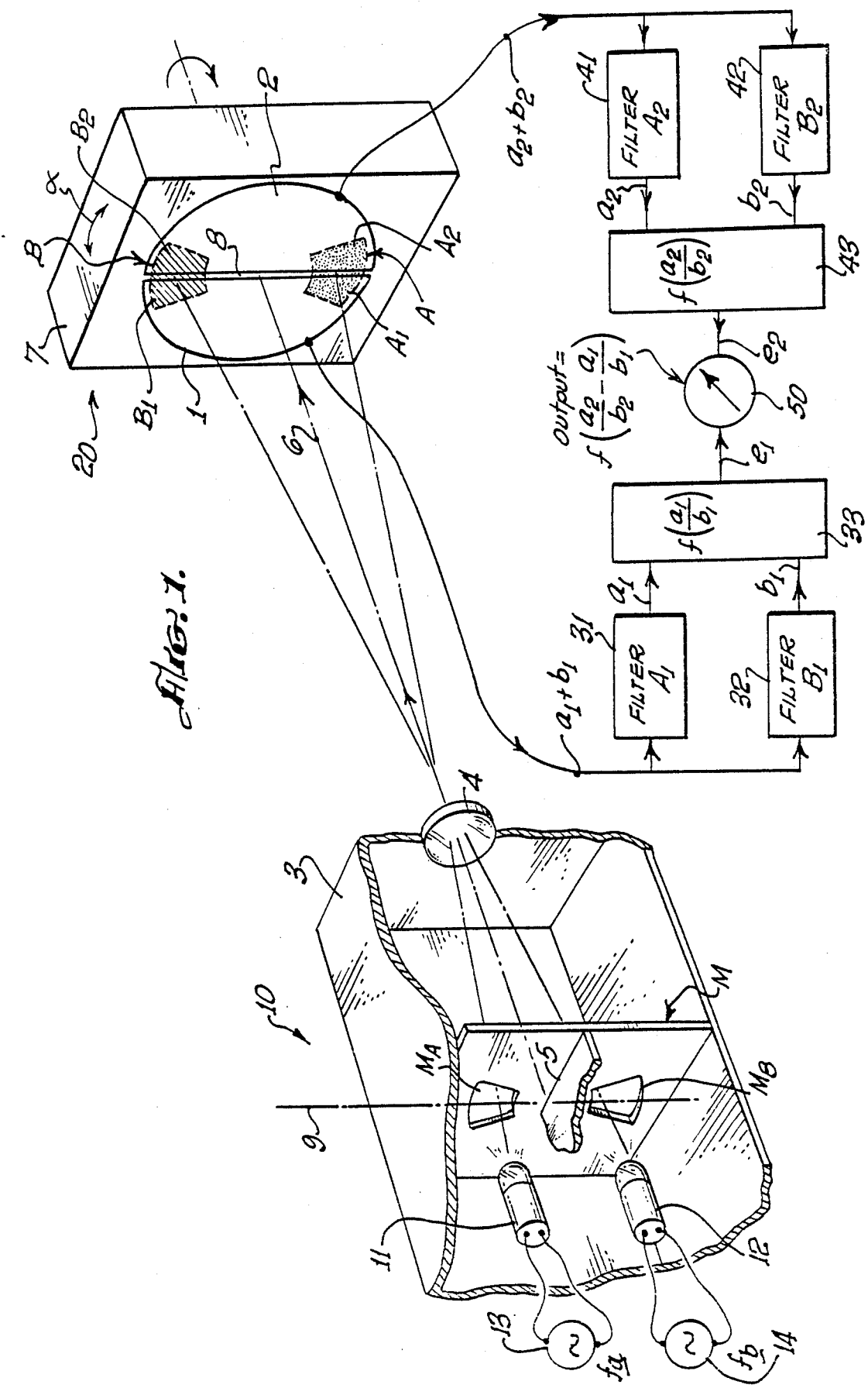
FIG. 1 is a simplified semi-diagrammatic cutaway perspective view of a roll angle detector system according to the invention.

Referring first to FIG. 1, an optical sending unit, indicated generally at 10, and a receiving unit at 20 are positioned at any suitable distance apart along an optical axis 6. This invention senses and measures angular displacement or roll about axis 6 of one of the above units relative to the other. The invention translates the roll angle into an electrical signal suitable for computer entry, readout, or the like, and provides that such signal is a function only of the roll angle, and independent of rectilinear displacements in a plane normal to optical axis 6, i.e., displacements in pitch and yaw.

In FIG. 1, the sending unit 10 comprises a suitable housing 3, a projection lens 4 having optical axis 6, and a mask M with apertures $M_A$ and $M_B$ disposed symmetrically about axis 6 and about a mask center line 9 which intersects axis 6 and bisects each of the apertures. A pair of light sources 11 and 12 are positioned so as to shine through the apertures $M_A$ and $M_B$, respectively. Cross-illumination may be prevented as by a partition 5.

Each of the two light sources is energized separately as from supplies 13, 14, whose electrical outputs are modulated differently. They may be modulated at different frequencies, as indicated at $f_a$, $f_b$, or in any other suitable known code. For convenience, this description will refer to frequencies.

Lens 4 images the mask apertures $M_A$ and $M_B$ onto two separate adjacent photosensitive surfaces or targets 1,2 on receiving unit 20. The dividing line between surfaces 1 and 2 is indicated at 8. Targets 1, 2 may be mounted on a suitable structure indicated at 7. They may be of any suitable known types; one appropriate kind is a divided silicon chip known as a bi-cell. The images are indicated with dotted outlines, image A of aperture $M_A$ and image B of aperture $M_B$. In the drawing, the images A, B are hatched differently to indicate the different modulation of the light from sources 11, 12. The apertures, and hence their images, are preferably sector-shaped as shown, but may be of other shapes. In FIG. 1, the direction of the roll angle to be measured is indicated by arrow $\alpha$.

Figure 2:
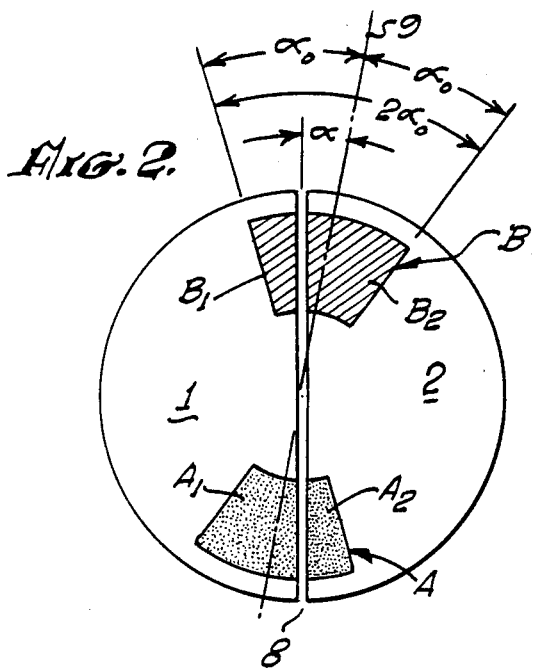
FIG. 2 is a diagrammatic face view of a photoelectric target showing roll-displaced images thereon.
Figure 5:
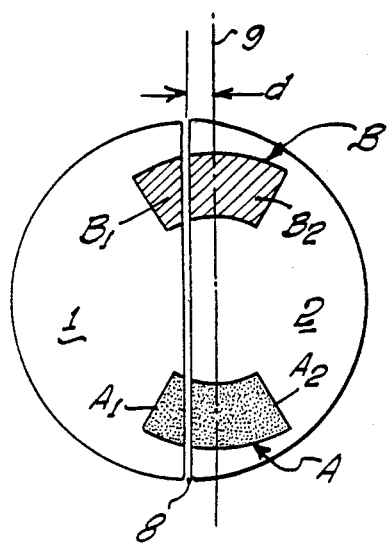
FIG. 5 is a diagrammatic face view of a photoelectric target showing yaw-displaced images without roll.

Within the device's range of operation, a portion of each of the images A, B will fall on both of the photosensitive surfaces or sensors 1, 2, as shown in FIGS. 1, 2, and 5. The portion of image B falling on sensor 1 is designated $B_1$, and the portion of sensor 2 as $B_2$; similarly with image A.

In FIG. 1, a signal-translating system is shown in block form. Photocurrent from sensor 1 is fed simultaneously to the inputs of two filters or decoders 31, 32. These may be ordinary band-pass filters centered respectively on the modulation frequencies $f_a$, $f_b$; or, if a code-modulation system is used, they would be suitable decoders. The signal from photosensor 1 thus consists of the sum $(a_1+b_1)$ of two separate signal components which are here designated $a_1$, $b_1$; and the outputs of elements 31, 32 are each proportional to $a_1$ and $b_1$, respectively. Signal $a_1$ is a generally linear function of the area $A_1$ of that portion of image A which falls on sensor 1, and signal $b_1$ a similar function of the area $B_1$ of that portion of image B which falls on the same sensor 1.

The same relations apply to signals $a_2$, $b_2$ from the portions of images A, B which fall on sensor 2.

Separated signals $a_1$ and $b_1$ are fed to a suitable known type of ratio computer 33, whose output signal $e_1$ is a function only of the ratio $a_1/b_1$, regardless of their absolute magnitudes. Such ratio computers have been made with servo-driven potentiometers, and with analog-to-digital converters and digital computer elements; integrated divider circuits are available. The ratio output signal $e_1$ is fed to one side of a suitable readout or other utilization device indicated generally at 50.

Still referring to FIG. 1, the composite photosensor output signal at the other side, signal $(a_2+b_2)$ from sensor 2, is processed in the same way as the signal $(a_1+b_1)$. The modulated components are separated by filters or decoders 41, 42, then fed separately to a ratio computer 43, whose output $e_2$ is a function solely of the ratio $a_2/b_2$. Thus, the utilization device 50 receives an input which is a function of the difference between the ratios of the two separated photocurrents from sensors 1 and 2, i.e., $$f(a_2/b_2 - a_1/b_1),$$

which is a measure of the roll angle $\alpha$.

The detailed nature of the transfer function is now considered. FIG. 2 shows a photosensing bi-cell or target with projected images of apertures $M_A$, $M_B$ indicated at A, B and with a roll angle $\alpha$. This angle is the angle between the bi-cell dividing line 8 and the projected center line 9 (FIG. 1) which bisects the two apertures. When these lines are parallel or coincide, $\alpha$ is taken as zero; clockwise angles of roll are taken as positive and anticlockwise as negative. The portion of image A falling on cell 1 is designated $A_1$, the portion of cell 2 designated $A_2$; similarly with image B.

By symmetry, the area ratios $A_1/B_1$ and $B_2/A_2$ are equal.

Figure 4:
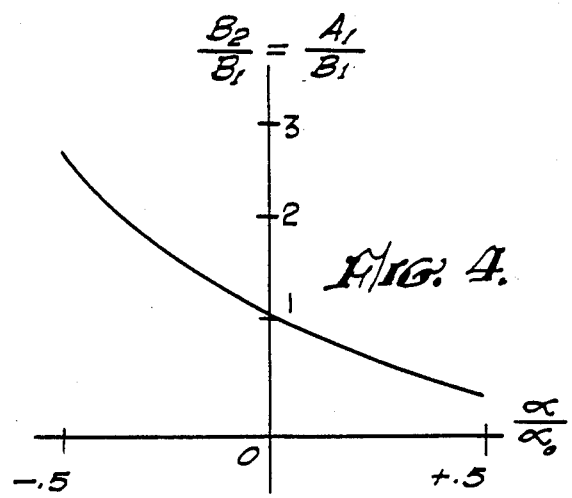
FIG. 4 is an explanatory graph.
Figure 3:
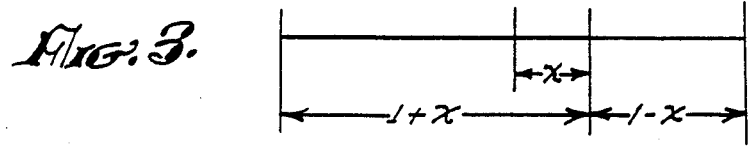
FIG. 3 is an explanatory mathematical diagram.

The relation between these ratios and the roll angle $\alpha$ is now considered. FIG. 3 indicates the general case of a quantity x varying between equal positive and negative limits $+1$ and $-1$, and dividing the distance between the limits into two parts $(1-x)$ and $(1+x)$. The former segment is taken to correspond to area $B_1$ of FIG. 2, the latter to area $B_2$, and the angle $\alpha$ to the variable x. The ratio of the areas $B_2/B_1$, and hence their output signals $b_2$, $b_1$, etc. (FIG. 1) is a function of the roll angle $\alpha$, and the function is of the form $(1+x)/(1-x)$. FIG. 4 illustrates a portion of this function as a curve. The function goes from zero at $x=-1$, through unity at $x=0$, to infinity at $x=+1$. FIG. 4 shows the middle fifty percent of the curve, where the ratio $A_1/B_1$ varies between ⅓ and 3. The angle is taken here as the fraction $\alpha/\alpha_o$ where is half the total angle of the sector image B or A (FIG. 2).

The general region shown in FIG. 4 covers a conveniently usable range of roll angle $\alpha$ in relation to the size of the images, and the curve has relatively moderate deviations from a straight line. Thus, any convenient computer means may be applied to linearize the relation in order to obtain a readout at utilization device 50 (FIG. 1) directly proportional to the roll angle.

FIG. 5 is a face-on view of the target or bi-cell 1, 2 with aperture images A, B displaced in yaw, but not in pitch or roll. The center line 9 bisecting the images A and B is displaced laterally from the bi-cell dividing line 8 by a distance d, but remains parallel to that line. It is evident that the areas $A_1$ and $B_1$ are equal and their ratio unity, just as if lines 8 and 9 coincided. Similarly, the areas $A_2$ and $B_2$ remain equal. Thus, with this condition of yaw displacement, the signal processing elements of FIG. 1 would produce no output at 50; the system is insensitive to yaw within the limits of the apparatus.

It will be obvious that displacements in pitch, i.e., vertically, of images A, B on target 1, 2 will similarly fail to produce any signal output to device 50, since the ratios $A_1/B_1$, etc. will be unaffected. Such relations obviously obtain as long as both the images A and B remain wholly within the boundaries of photosensitive surfaces 1, 2 and straddle at some point the dividing line 8.

The mask apertures $M_A$, $M_B$, FIG. 1, are shown shaped as sectors for simplicity of analysis. They may be given other shapes, such as shapes to linearize the curve of FIG. 4.

I claim

1. A roll angle detector comprising:
   optical sending means having an optical axis and a mask disposed in a mask plane generally normal to said axis, said mask having at least two apertures disposed symmetrically about said optical axis and bisectable by a mask aperture axis in their own plane;
   imaging means producing an image of each said aperture on a receiving means which has two photodetectors separated by a dividing line, part of each said image falling on each side of said dividing line;
   modulation means rendering photocurrents from each said detector separable into a pair of separate component signals, and separating means producing a said pair for each said photodetector;
   means to compute the ratio of the said component signals of each said pair, and means to compute the difference of said ratios,
   said roll angle being the angle between said mask aperture axis and said dividing line in rotation about said optical axis, and
   said difference being a measure of said roll angle and being substantially independent of linear displacements of said images parallel to said mask plane.

2. A roll detector as in claim 1 wherein:
   said modulation means comprises a separate light source behind each said aperture and power supplies delivering energy of different and distinguishable waveforms to each said source.

3. A roll detector as in claim 2 wherein said supplies are of different frequencies.

4. A roll detector as in claim 2 wherein said supplies are modulated in different time codes.

5. A roll detector as in claim 2 wherein said photodetectors are in the form of a planar silicon cell divided down the middle.

6. A roll detector as in claim 5 wherein said apertures are shaped generally as sectors of a disk.

* * * * *